Aug. 7, 1945.    M. A. CLARK    2,381,806
METAL BORING TOOL
Filed Dec. 2, 1943
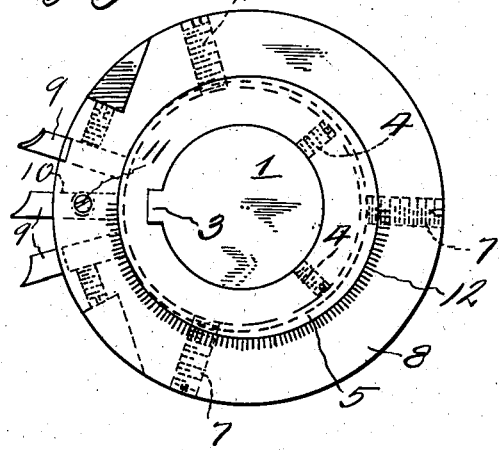
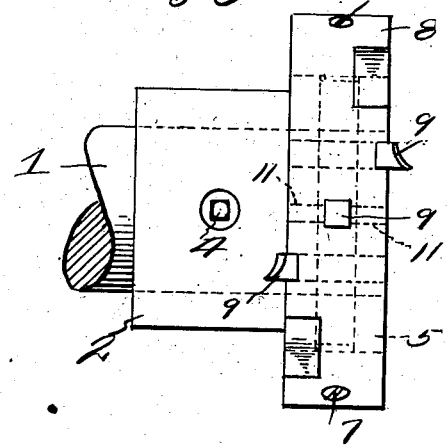
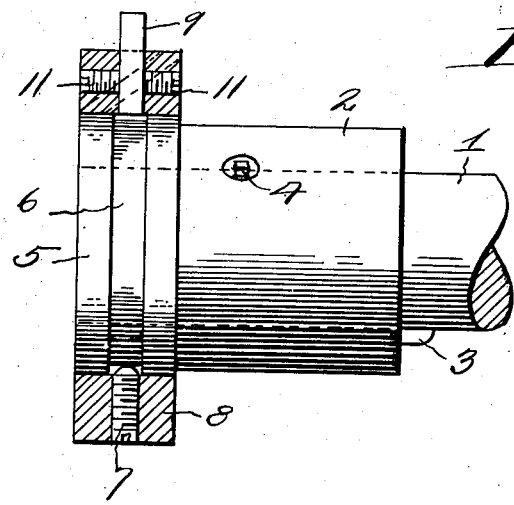
Inventor
Milton A. Clark
By Philip A. H. Terrill
Attorney Patented Aug. 7, 1945

2,381,806

UNITED STATES PATENT OFFICE 2,381,806

METAL BORING TOOL

Milton A. Clark, Mexico, Mo.

Application December 2, 1943, Serial No. 512,641

2 Claims. (Cl. 77—58)

The invention relates to metal boring tools particularly adapted for use in connection with boring bars, and has for its object to provide a boring head or tool holder which may be readily attached to the boring bar and provided with an eccentrically mounted rotatably adjustable tool holding ring adapted to be rotatably adjusted to move the cutting tool outwardly or inwardly to various positions in relation to the axis of the boring bar for taking cuts of predetermined depth from work.

A further object is to provide a boring head adapted to be mounted on a driven member and the head with an eccentric tool ring receiving end and the ring with set screws extending inwardly and into an annular groove in the eccentric end thereby preventing marring of the eccentric surface incident to continual use.

A further object is to provide the ring with a plurality of cutting tool receiving apertures for holding cutting tools at various angles.

A further object is to provide a scale on the rotatably adjusted part so that the cutting ends of the tool can be adjusted outwardly or inwardly predetermined distances.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view in elevation of the outer end of the tool carrying head.

Figure 2 is a side elevation.

Figure 3 is a side elevation showing the tool carrying ring in vertical longitudinal cross section.

Referring to the drawing, the numeral 1 designates the boring bar which may be of any length desired, and 2 a cutter head sleeve secured to the boring bar by a key 3 and set schews 4. The outer end of the sleeve 2 terminates in an eccentric tool ring carrying head 5, which is eccentric in relation to the axis of the boring bar 1. The amount of eccentricity is preferably about one eighth of an inch, however applicant does not limit himself in this particular. The eccentric head 5 is provided with an annular groove 6 into which the set screws 7, carried by the tool carrying ring 8, extend. Ring 8 is rotatably adjustable on the eccentric head 5 so that the angularly disposed cutter tool 9 may be adjusted outwardly or inwardly in relation to the work, for instance a tubular element. It has been found desirable and necessary to maintain the periphery of the eccentric head 5 smooth at all times so that the ring 8 can be easily adjusted. To accomplish this result the set screws 7 engage in the bottom of the annular groove 6, therefore the engaging surfaces, and particularly the periphery of the eccentric head will not be marred and any marring of the set screws takes place in the bottom of the annular groove 6, consequently the periphery of the eccentric head 5 is maintained smooth at all times, and easily adjustable rotatably.

The central cutter 9, carried by the ring 8 is radially disposed in an aperture 10 in the ring 8 and held in position by set screws 11 cooperating with opposite sides of the cutter. The other cutters 9 are angularly positioned as shown in Figure 2 and extend diagonally across the annular ring 8, clearly shown in Figure 2.

The opposite faces of ring 8 are provided with graduations 12 extending partially or all the way around the device so that the amount of outward or inward adjustment may be accurately gauged. The graduations are preferably in thousandths of an inch.

From the above it will be seen that an adjustable cutter head is provided which is eccentrically mounted and one which may be easily and quickly adjusted for various cuts.

The invention having been set forth what is claimed as new and useful is:

1. A metal working cutting tool comprising a sleeve adapted to be received on the end of a cutter bar, an eccentric head carried by said sleeve integral therewith and of greater diameter than the sleeve and having an annular channel thereby forming the head into two eccentric bearing surfaces, an annular cutter tool carrying ring surrounding the eccentric head and rotatable thereon to adjusted positions, means carried by the ring and cooperating with the bottom of the channel of the head for holding the ring in adjusted positions, said ring being of the same width as the head and means whereby cutters may be received in the ring at different angular positions in relation to the axis of the cutter bar.

2. A device as set forth in claim 1 wherein the cutter carrying ring is provided with diagonally extending apertures for the reception of cutters and means carried by the ring and cooperating with cutters for holding the cutters in adjusted position.

MILTON A. CLARK.